United States Patent [19]
Roth

[11] Patent Number: 5,117,969
[45] Date of Patent: Jun. 2, 1992

[54] WIDE BELT ALIGNMENT SYSTEM

[75] Inventor: Curtis A. Roth, Post Falls, Id.

[73] Assignee: Thermoguard Equipment, Inc., Spokane, Wash.

[21] Appl. No.: 728,658

[22] Filed: Jul. 11, 1991

[51] Int. Cl.$^5$ .............................................. B65G 39/16
[52] U.S. Cl. ..................................... 198/807; 226/23; 474/104
[58] Field of Search ................ 198/806, 807; 474/102, 474/103, 104, 119, 122; 226/21, 22, 23

[56] References Cited

U.S. PATENT DOCUMENTS

| | | | |
|---|---|---|---|
| 2,331,030 | 10/1943 | King | 226/22 |
| 2,655,252 | 10/1953 | Spurgeon | 198/806 |
| 3,312,335 | 4/1967 | Paris et al. | 198/807 |
| 3,407,673 | 10/1968 | Slezak | 474/104 |
| 3,785,542 | 1/1974 | Edes et al. | 226/22 |
| 4,173,904 | 11/1979 | Repetto | 198/807 X |

Primary Examiner—Robert P. Olszewski
Assistant Examiner—Cheryl L. Gastineau
Attorney, Agent, or Firm—Wells, St. John & Roberts

[57] ABSTRACT

The present invention relates to a conveyor belt alignment system by which a pair of alignment rollers are mounted on a carrier frame about a pivot axis that is situated at the approximate transverse center between opposed longitudinal side edges of a conveyor belt. The alignment rollers are spaced longitudinally to accept and form a portion of the conveyor belt into a substantial "s" configuration. The centrally pivoted carrier frame and alignment rollers are pivoted by a pair of bladders 50, 51. Inflation of the bladders is controlled through a sensor 54 provided to detect the transverse position of an adjacent belt edge. If the belt edge shifts in one direction, the sensor detects such motion and operates the drive to selectively inflate one or the other of the air bladders to correspondingly shift the belt aligning rollers. The misaligned belt is brought back to the desired tracking configuration where the sensor detects the desired orientation and permits the system to return to a normal, desired operating mode.

11 Claims, 3 Drawing Sheets

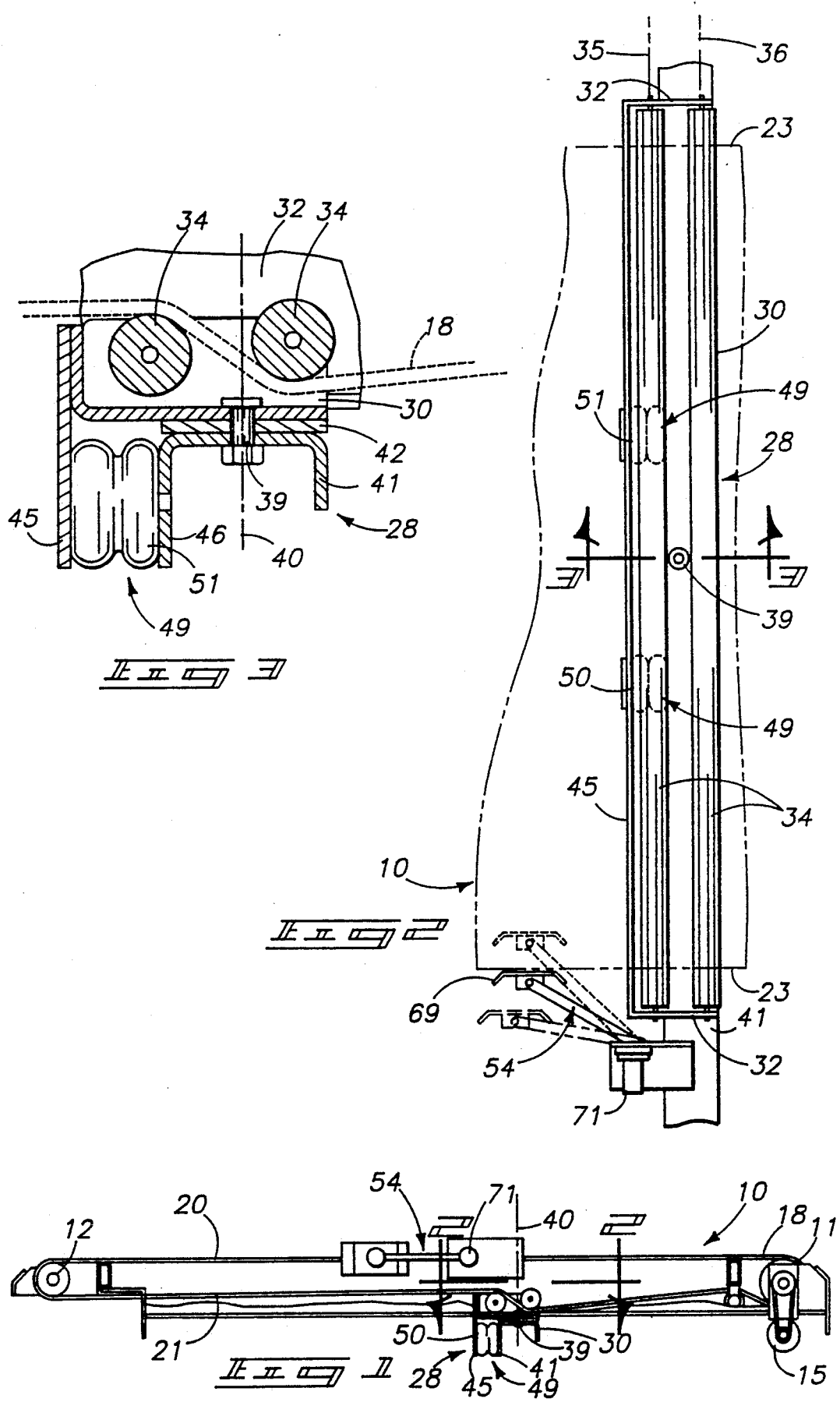

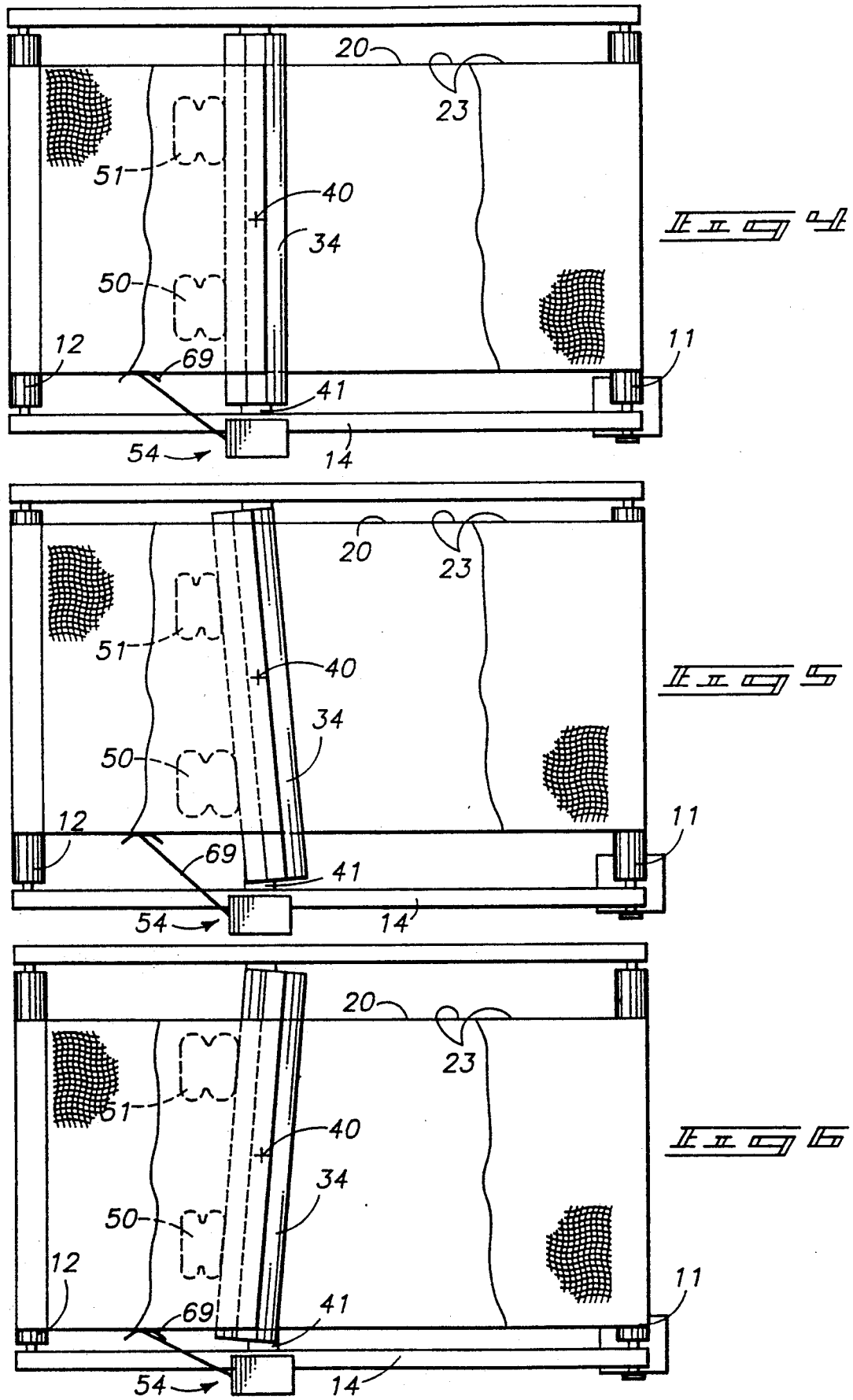

WIDE BELT ALIGNMENT SYSTEM

TECHNICAL FIELD

The present invention relates to apparatus for maintaining alignment of a conveyor belt between a head roller and a tail roller on a conveyor.

BACKGROUND OF THE INVENTION

Belt tracking is a problem in any industry that uses conveyor belts. It is usually not a major problem but a maintenance nuisance that progressively becomes a major cost over a period of time.

Several variables affect belt tracking. The first and, perhaps most obvious, is misalignment of one or both conveyor end rollers. Misalignment of the rollers will cause corresponding belt tracking problems. Uneven tension applied to a belt can also result in tracking problems. Uneven tension will result in "stretching" of the belt on one side, thereby resulting in belt sides of unequal length. This also creates tracking problems. Uneven loading of conveyor belts also causes tracking problems as well as unequal driving forces across the belt width.

Numerous systems and concepts have been tried to eliminate persistent belt alignment problems.

Various conveyor belts have been developed over the years with design considerations relating to accurate tracking. Some belts will track better than others, but within any belt the ability to track varies considerably. This is due to the myriad of variables in the production of a belt. In order to produce a near perfect belt, the weave within the belt must be perfectly straight before the belt is coated or laminated. When the belt is cut for width, the cut must be straight with respect to the weave. Further, when the belt is cut to a desired length, the cut and lacing must be carefully executed to be square with the belt edges. If any of the above factors are off, the belt will track improperly.

Compounding this problem is the possibility of stretching the belt upon installation in order to correct for the manufacturing flaws. Overcorrection during initial tracking adjustments of the belt may result in stretching the belt in inappropriate areas. This may result in still further tracking problems. Undesired belt stretching may also be attributed to off-center loading.

Given the understanding that precision manufacture of belting is an impractical solution, and that activities such as improper loading, overcorrection, etc. may occur at any given time, there becomes a recognized need to provide some form of belt alignment correction that will compensate automatically for inappropriately constructed, mounted, and loaded belts.

Since it has been found that nearly any belt has a tendency to track improperly, the next solution attempted was to correct for the misalignment by periodically or consistently shifting the belt to an aligned, proper tracking orientation.

One attempt at the above solution is recognized in the crowned pulleys that have been commercially available for some time. A crowned pulley in a conveyor system will typically help belt tracking, if the belt is well constructed and used. Otherwise, the degree of crown on such pulleys is insufficient to influence proper tracking.

Another conventional attempt to correct for belt misalignment is the use of an angled snub roller. An angled snub roller can be used to overcome a belt tracking in a particular direction. Unfortunately, the influence of an angle snub roller depends on belt tension and load on the associated conveyor. If the load or belt tension changes, the belt position may correspondingly change unless scrupulous attention is made to adjustments with the snub roller.

Another attempt at assisting proper tracking of conveyor belts is the use of belt side guides. Plastic guide blocks are often used to confine an edge of a conveyor belt within the conveyor system. Unfortunately, pushing on the edge of the belt will not suffice to overcome the force of a misaligned belt, especially when the belt is under load. The blocks therefore help only to prevent major damage when "walk off" occurs.

Another attempt to overcome the above problems has been made in the belt drive system by lagging the drive pulley from the center out. This has favorable results over lagging from one side of the drive pulley to the other but is not a significant influence in belt tracking to avoid the adverse effects from poor belt construction or the tracking influences discussed above.

A combination of solutions has been attempted in certain conveyor belts which are now being designed with a "v"-belt laminated to the bottom center of the conveyor belt. The head pulley and tail pulley of the conveyor are then supplied with complementary "v" grooves to receive the "v"-belt.

The belt riding in these grooves forces the belt to stay in a centered, tracking orientation, as long as the "v"-belt is perfectly centered and in a straight line along the conveyor belt. Otherwise, the "v"-belt has a tendency to "climb" out of the "v" grooves and consequently stretch the belt in that area. Additionally, if lacing is not matched up correctly, the "v"-belt would not be lined up and would climb out of the grooves.

Furthermore, in wide belt applications, there is insufficient traction by a single "v"-belt to overcome any misalignment tendency that would occur along the broad frictional engagement between the head and tail rollers and the belt.

A more successful attempt has been made to provide an attachment to existing conveyors by which the return flight of the conveyor is trained over a pair of pivoted alignment rollers "midstream" between the head and tail conveyor rollers. These rollers are pivoted on one side of the conveyor in a selective manner by an air or hydraulic cylinder connected between the conveyor frame and the alignment rollers.

The cylinder may be selectively actuated to extend or retract, thereby swinging the alignment rollers to one side or the other of the pivot axis to affect tracking of the belt. This works well with the exception that the alignment rollers and carriage are quite bulky by nature and may not be used in confined places, especially with fairly short run conveyors.

All the pivotal motion of the alignment rollers is initiated from one side of the conveyor so the cylinder must have a significant stroke to accommodate for alignment problems to opposite sides of the head and tail rollers. This causes a problem, especially as indicated above, where the conveyor is to be used in confined quarters.

It therefor becomes clear that there remains a need for a compact yet effective system by which a conveyor belt may be selectively held in a prescribed aligned orientation with respect to head and tail rollers on a conveyor. The need is especially felt for such a device that will function in an effective manner to train belts of various width and length dimensions to operate along a prescribed path.

BRIEF DESCRIPTION OF THE DRAWINGS

A preferred form of the present invention is illustrated in the accompanying drawings in which:

FIG. 1 is a side elevation view of a conveyor including exemplary elements of the preferred form of the present invention;

FIG. 2 is a top plan view of the present belt alignment roller system;

FIG. 3 is an enlarged sectional view taken substantially along line 3—3 in FIG. 2;

FIGS. 4-6 are diagrammatic views illustrating operation of the present alignment system.

DETAILED DESCRIPTION OF A PREFERRED EMBODIMENT

Figure 7:
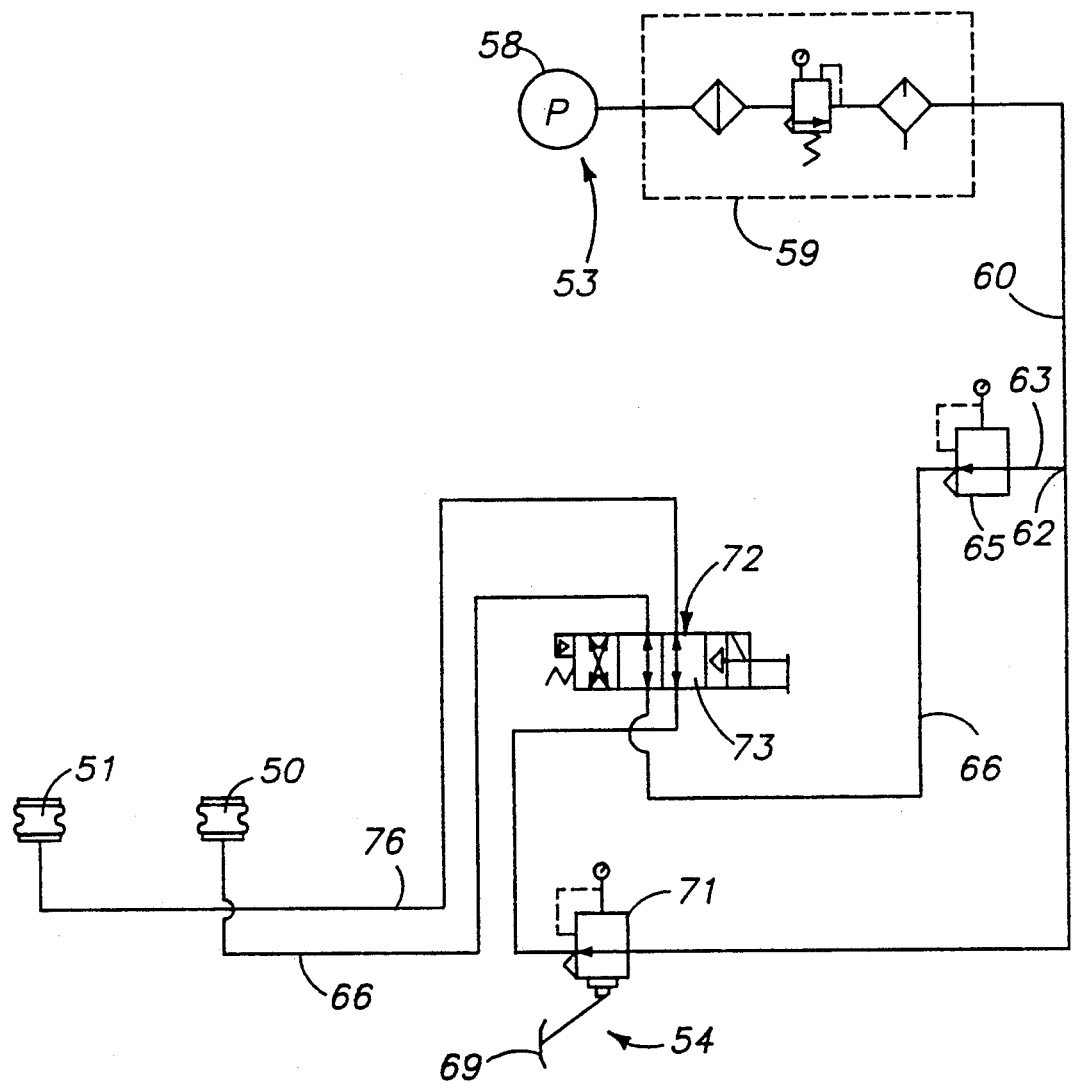
FIG. 7 is a schematic view illustrating a control circuit and drive means for the present system.

This disclosure of the invention is submitted in furtherance of the constitutional purposes of the Patent Laws "to promote the progress of science and useful arts" (Article 1, Section 8).

The present invention is intended for use with conveyors 10 of the sort incorporating an elongated flexible endless belt 18 trained over a head roller 11 and a tail roller 12. The head roller 11 is powered to rotate by a conveyor drive 15. The typical conveyor 10 includes a relatively rigid conveyor frame 14 holding the rollers 11, 12 in substantially parallel orientation for rotation about parallel rotational axes.

The conveyor belt 18 is trained about the head and tail rollers 11, 12, therefore forming a working flight 20 and a return flight 21. For purposes of further description, the belt 18 is described as including a transverse width dimension between longitudinal belt edges 23.

The actual dimensions of the belt width and length may vary. However, the term "longitudinal" should be understood as meaning a direction along the belt that is coincidental with or substantially aligned with the direction of belt travel. Thus the longitudinal dimension of the belt is that dimension of the belt extending between the head and tail rollers 11, 12.

The present alignment system is generally shown by the reference numeral 28. The alignment system is connected to the conveyor 10 for the purpose of maintaining the belt 18 in a prescribed desired alignment condition (FIG. 4) and to correct misaligned conditions as indicated in FIGS. 5 and 6.

The present alignment system 28 may be attached as a retrofit unit to existing conveyor systems, or may be manufactured directly with the conveyors as a combination. In either configuration, the alignment system operates similarly to achieve the same results and utilizes very similar components to be described below.

Alignment system 28 includes a carrier frame 30. Carrier frame 30 is an elongated rigid framework including, in the preferred form, upstanding end flanges 32. A pair of alignment rollers 34 are freely rotatably mounted between the end flanges 32.

The rollers 34 rotate freely about parallel roller axes 35 and 36, spaced longitudinally with respect to the longitudinal dimension of the conveyor. The spacing is such that the conveyor belt 18 may be trained over the rollers 34 and form a substantially "s"-shaped configuration as shown in FIG. 1 and in dashed lines in FIG. 3.

The above engagement of the belt between the rollers enables the rollers to gain a free rolling "purchase" along the belt to facilitate guiding of the belt responsive to pivotal motion of the carrier frame 30.

Carrier frame 30 is mounted by a pivot 39 to a cross member 41 of the conveyor frame 14. The pivot 39 is also substantially centered transversely between the longitudinal side edges 23 of the belt when aligned as shown in FIG. 4. The pivot 39 is also substantially centered along the length dimension of the carrier frame so that pivotal motion of the carrier frame will result in equal and opposite pivotal motion of the carrier frame ends. This motion is also imparted to the alignment rollers 34.

Pivotal motion of the carrier frame about the pivot axis 40 will cause the rollers 34 to "walk" the engaged belt toward either of the lateral sides of the conveyor.

Such pivotal motion is obtained by an extension means 49 mounted between the conveyor frame 14 and carrier frame 30. The extension means 49 is provided for selective operation to pivot the carrier frame 30 and alignment rollers about the pivot axis 40.

The extension means 49 includes at least one inflatable fluid bladder 50. In the preferred form, two such bladders 50, 51 are provided, one to each side of the pivot axis 40. It is preferred that the bladders 50, 51 each be situtated equidistant from the pivot axis 40, inwardly of the conveyor belt longitudinal side edges 23.

The bladders 50, 51 are mounted between a flange 46 on the conveyor cross member 41 of the conveyor frame, and a depending bracket 45 on the carrier frame 30 (FIG. 3). Differential inflation of the bladders 50, 51 (FIGS. 4-6) will thus cause angular pivotal motion of the carrier frame and alignment rollers about the pivot axis 40.

Of interest is the relationship of the alignment rollers 34 to the pivot axis 40. The alignment rollers 34 are mounted on parallel rotational axes. It is preferred that the pivot axis 40 be situated along the longitudinal dimension of the conveyor between the two rotational axes of the alignment rollers. This is done to minimize the moment arm applied by belt tension as the belts are trained around the rollers 34 in the "s" configuration.

Additionally, the bladders 50, 51 are mounted between the conveyor frame and carrier frame at positions longitudinally spaced from the pivot axis 40 to further offset the moment applied by the belt. Thus, the forces applied at the central pivot 39 are substantially equalized or offset against one another so that inflation and deflation of the bladders 50, 51 will result simply in torsional forces being applied about the axis 40.

Selective inflation of the bladders is responsive to a drive means 53 shown generally in FIG. 7 of the drawings. Drive means 53 operatively connects a sensor means 54 and the extension means 49 in order to pivot the carrier frame selectively about axis 40 in response to belt misalignment detected by the sensor means 54.

The drive means 53 responds to the sensor means 54 by differentially inflating the bladders 50 or 51 by shifting the belt engaged on the alignment rollers back to the prescribed aligned condition shown substantially in FIG. 4.

The drive means 53 is, in the preferred form, comprised of a fluid circuit 57 (FIG. 7) connecting a pump 58 and the inflatable bladders 50, 51. The pump 58 preferably is a conventional form of air pump supplying air pressure through a filter and pressure regulator 59 to a fluid line 60 at approximately 80 to 90 psi.

A tee 62 is situated within the fluid line 60 to connect a second fluid line 63. Line 63 extends to a pressure regulating valve 65. The valve 65 is set to a prescribed pressure value (say 30 to 40 psi) to control the air pressure delivered through a fluid line 66 to the first fluid bladder 50. This line runs through a reversing means 72 which will be described in further detail below.

The fluid line 60 also extends to the sensor 54 which includes a variable pressure valve 71 operated by a belt side edge engaging paddle 69 at the end of an actuator arm 70. The paddle 69 and actuator arm are spring biased so the paddle will remain in constant sliding engagement with the adjacent conveyor belt side edge 23.

The actuator arm 70 is connected to a variable pressure regulating valve 71 that, depending upon the deflection of the paddle 69, will increase or decrease pressure to a line 76 extending to the second bladder 51. This line also passes through the reversing means 72.

The reversing means 72 is provided to reverse the differential inflation function of the bladders 50, 51 in order to accommodate reverse motion of the conveyor belt. Thus, by reversing the connection to the variable and constant pressure valves 71, 65, the present system may be used with the belt moving in either direction.

The reversing means 72 is simply comprised of a valve 73 which may be manually or automatically operated upon reversal of the conveyor drive motor, to shift fluid flow from the valves 71 and 65 to the bladders 50 and 51. Reversing the connection of these valves to the bladders will result in opposite motion of the alignment rolls upon actuation of the sensor 54.

In operation the paddle 69 is biased gently against the adjacent a belt edge 23 so that the movement of the belt beyond the desired tracking condition (FIG. 4) will cause corresponding motion of the paddle 69 (FIGS. 5-6). If the belt becomes misaligned, the paddle 69 will follow the misaligned edge belt and operate the variable pressure valve 71 to correspondingly vary the amount of pressure delivered to the second bladder 51.

If misalignment occurs in one direction (FIG. 5) the variable pressure valve 71 will be operated to reduce pressure to bladder 51 compared to the present pressure in the first bladder 50 (as determined by the constant pressure regulating valve 65). The bladders will thus be differentially inflated, and will pivot the carrier frame on its center axis 40 in one direction.

On the other hand, if the belt tracks to an opposite lateral direction (FIG. 6), the paddle 69 will be operated to open the valve 71 to allow additional pressure to be applied through the line 76 to the second fluid bladder 51. The bladder 51 will inflate to greater proportions than the first bladder 50 and will correspondingly cause the carrier frame and attached alignment rolls to pivot in an opposite direction.

Normally the paddle 69 is positioned in the desired tracking orientation of the belt, just touching an adjacent longitudinal belt edge 23 when the belt is situated in the desired tracking position. As the conveyor operates, if the belt becomes misaligned, the paddle will follow the edge and correspondingly operate the valve as indicated above. Thus, the conveyor belt is automatically maintained in the aligned condition.

A distinct advantage of the system described above is the compact configuration of the unit. The pivot axis 40 is situated substantially midway between the side edges of the belt and between the ends of the carrier frame. Thus, operation of the bladders as described above can affect a substantial change in the belt alignment with relatively small pivotal motion of the carrier frame. This is due to the fact that the carrier frame ends move equal and opposite distances as the carrier frame is pivoted.

Thus, to establish a correction of the belt in this manner, a movement of the carrier frame and alignment rolls need be only one half of the amount of the same system if it was pivoted from one or the other ends of the carrier frame, as accomplished by prior art mechanisms.

From the above description, it may be understood that the present system facilitates automatic belt alignment with the sensor reacting to maintain the belt in the center of the conveyor without damage to the belt.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. An alignment system for a conveyor having a wide conveyor belt with a transverse width dimension between longitudinal edges trained over a pair of longitudinally spaced end rollers on a conveyor frame forming the belt into a working flight and a return flight, the system comprising:

an alignment roller carrier frame;

pivot means mounting the alignment roller carrier frame to the conveyor frame at a location thereon longitudinally between the end rollers thereof for movement about a pivot axis substantially centered between the longitudinal edges of the conveyor belt;

a pair of alignment rollers mounted to the carrier frame for engaging and training a portion of the conveyor belt in an approximate "s" configuration;

extension means comprised of a pair of inflatable bladders mounted between the carrier frame and conveyor frame with one bladder spaced transversely to one side of the pivot axis and the other bladder spaced transversely to an opposite side of the pivot axis, said bladders being selectively inflatable to pivot the carrier in opposed directions about the pivot axis;

sensor means for detecting a misalignment of the conveyor belt in relation to a prescribed aligned condition in relation to the conveyor rollers;

drive means operatively connecting the sensor means and extension means for producing pressure to inflate the bladders to pivot the carrier frame selectively about the pivot axis; and valve means for regulating pressure to one of the bladders to a prescribed pressure and to the other bladder at a variable pressure responsive to alignment conditions of the conveyor belt as detected by the sensor means, to thereby shift the belt engaged on the alignment rollers to the prescribed aligned condition.

2. An alignment system as claimed by claim 1, wherein the valve means is comprised of;

a constant pressure valve connected to the power means for applying a constant pressure through to one of the bladders; and a variable pressure valve means, operably connected between the sensor means and the power means for applying a variable pressure to the other bladder responsive to the sensor detecting alignment conditions of the conveyor belt.

3. An alignment system as claimed by claim 1, wherein the alignment rollers are mounted to the carrier frame for free rotational motion about parallel alignment roller axes, and wherein the pivot axis is situated between the alignment roller axes.

4. An alignment system as claimed by claim 1 for a conveyor selectively operated in a forward or reverse mode, further comprising reversing means connected to the sensor and drive means for operating the drive means in reverse to accommodate the reverse mode of conveyor operation.

5. An alignment system as claimed by claim 1, wherein the pair of bladders are air bladders, and wherein the air bladders are longitudinally spaced from the pivot axis; and wherein the pivot axis is located between the alignment rollers.

6. An alignment system as claimed by claim 1, wherein the pair of bladders are air bladders; and wherein the drive means includes a source of air pressure;

a circuit extending to the air bladders;

wherein the valve means is located in the circuit to regulate air pressure to the bladders individually.

7. An alignment system as claimed by claim 1, wherein the pair of bladders are air bladders; and reversing means for switching the valve means to regulate air pressure to said one of the bladders at a variable pressure, and for regulating air pressure to said other bladder at said prescribed constant pressure.

8. An alignment system as claimed by claim 1, wherein the pivot axis is centered transversely between the side edges of the belt and is perpendicular to the belt.

9. An alignment system as claimed by claim 1, wherein the pivot axis is centered longitudinally between the pair of alignment rollers.

10. A conveyor, comprising:

a conveyor frame;

a pair of rollers including a head roller and a tail roller;

an endless conveyor belt trained over the head and tail rollers and formed by the head and tail rollers into a working flight and a return flight;

a conveyor drive for operating the belt to move about the working and return flights;

an alignment roller carrier frame;

pivot means mounting the alignment roller carrier frame to the conveyor frame at a location longitudinally between the head and tail rollers thereof for pivotal movement about a pivot axis situated at the approximate transverse center of the conveyor belt;

a pair of alignment rollers mounted to the carrier frame and longitudinally spaced along the conveyor flights engaging and training the conveyor belt in an approximate "s" configuration;

extension means comprised of a pair of inflatable bladders operatively mounted between the carrier frame and the conveyor frame and selectively inflatable to pivot the carrier frame and alignment rollers mounted thereto about the pivot axis;

sensor means for detecting a misalignment of the conveyor belt in relation to an aligned condition in which the belt is substantially centered transversely on the head and tail rollers;

alignment drive means operatively connecting the sensor means and extension means for producing fluid pressure for operating the extension means to pivot the carrier frame selectively about the pivot axis; and valve means for regulating fluid pressure from the drive means for regulating fluid pressure to one of the bladders at a prescribed pressure and to the other bladder at a variable pressure to thereby pivot the carrier frame selectively about the pivot axis in response to the sensor means, to guide the belt over the alignment rollers toward the aligned condition.

11. A conveyor as claimed by claim 10, reversing means for switching the valve means to regualte fluid pressure to said one of the bladders at a variable pressure, and for regulating fluid pressure to said other bladder at said prescribed pressure.

* * * * *